United States Patent [19]

Campbell

[11] Patent Number: 5,370,582

[45] Date of Patent: Dec. 6, 1994

[54] GUARD FOR A ROTATING SHAFT
[75] Inventor: Joseph K. Campbell, Dryden, N.Y.
[73] Assignee: Cornell Research Foundation, Inc., Ithaca, N.Y.
[21] Appl. No.: 36,169
[22] Filed: Mar. 24, 1993
[51] Int. Cl.⁵ .............................................. F16D 3/84
[52] U.S. Cl. ...................................... 464/170; 464/29; 24/303; 403/DIG. 1
[58] Field of Search ...................... 464/23, 29, 30, 170; 74/609, 612; 403/345, DIG. 1; 24/49 M, 303

[56] References Cited

U.S. PATENT DOCUMENTS

| | | | |
|---|---|---|---|
| 1,499,694 | 7/1924 | Rogers. | |
| 2,684,210 | 7/1954 | Conti | 464/29 X |
| 2,890,710 | 6/1959 | Hartman | 137/382 |
| 2,929,477 | 3/1960 | Rodriguez et al. | 464/29 X |
| 3,221,389 | 12/1965 | Cowell | 464/29 X |
| 3,386,312 | 6/1968 | Weasler | 74/609 |
| 3,670,646 | 6/1972 | Welch, Jr. | 24/303 X |
| 3,970,407 | 7/1976 | Uffman | 403/DIG. 1 X |
| 4,114,400 | 9/1978 | Schlenker | 64/3 |
| 4,716,922 | 1/1988 | Camp | 403/DIG. 1 X |
| 4,779,484 | 10/1988 | Poe | 74/608 |
| 4,911,640 | 3/1990 | Schwab | 403/DIG. 1 X |
| 4,940,452 | 7/1990 | Rohe et al. | 403/DIG. 1 X |

Primary Examiner—Clifford D. Crowder
Assistant Examiner—John J. Calvert
Attorney, Agent, or Firm—Jones, Tullar & Cooper

[57] ABSTRACT

A magnetic shaft guard for use with a rotating shaft has a permanent magnet to hold the guard in place on the rotating shaft. Sufficient clearance is present between the shaft and an inner diameter of the guard so that the guard will cease rotation freely relative to the shaft should external contact with the guard occur. A spiral or other design may be placed on the guard to visually alert persons in the vicinity that the shaft is rotating.

12 Claims, 1 Drawing Sheet

GUARD FOR A ROTATING SHAFT

FIELD OF THE INVENTION

The present invention is directed generally to a shaft guard. More particularly, the present invention is directed to a removable shaft guard for use with rotating shafts and the like. Most specifically, the present invention is directed to a removable shaft guard for installation on a rotating shaft and which is held in place on the shaft by a permanent magnet. The shaft guard is usable to protect people, animals, or objects from injury which might otherwise result from accidental contact with the rotating shaft.

DESCRIPTION OF THE PRIOR ART

Exposed shaft ends are frequently present in machine shop equipment, farm equipment, vehicles, heavy machinery, and the like. When these shafts are rotating, often at high rates of speed, they create a hazard to people, animals, or objects that may inadvertently come into contact with them. To protect against injury from contact with such shafts, it is common practice to cover these exposed shafts with guards, caps, or housings of one type or another.

In the past, there have been numerous attempts to provide removable shaft guards that were easily and cheaply manufactured and installed. For example, in U.S. Pat. No. 1,499,694 to Rogers there is shown a removable shaft cap for an automobile crank shaft. The shaft cap is held in place on the shaft by spring fingers which engage with a groove in a collar on the shaft and allow the shaft cap to be easily removed. This arrangement, however, requires that a special collar be placed on the shaft for receiving and retaining the cap.

In U.S. Pat. No. 3,386,312 to Weasler there is shown a safety cap for the stub shaft of a tractor power take-off. The safety cap fits over a splined shaft, and is retained thereon by a groove in the shaft. The safety cap is freely rotatable relative to the shaft so that any external contact with the safety cap will cause the safety cap to cease rotation. The safety cap of Weasler is easily removable, but requires that a groove be cut into the shaft for retaining the cap.

U.S. Pat. No. 4,114,400 to Schlenker provides a safety sleeve for a rotating shaft featuring a double sleeve design. An inner sleeve is mounted on the shaft by set screws, and an outer sleeve is held in place over the inner sleeve by snap rings. When contact is made with the outer sleeve, the frictional engagement between the inner and outer sleeves is broken, and the outer sleeve remains stationary while the inner sleeve continues to rotate with the shaft. The Schlenker design, however, requires a large number of parts, and is relatively difficult to manufacture and assemble.

From the foregoing, and from an examination of other art in the area, it will be apparent that a need exists for a shaft guard which does not require modification to the shaft or machinery, and which is easily manufactured and simply installed. The magnetic shaft guard in accordance with the present invention overcomes the limitations of the prior devices and provides a significant advance in the art.

SUMMARY OF THE INVENTION

P It is an object of the present invention to provide a magnetic shaft guard.

Another object of the present invention is to provide a magnetic shaft guard which will rotate with the shaft, but cease rotation upon contact with a person, animal, or object.

A further object of the present invention is to provide a shaft guard that is easily and inexpensively manufactured.

An additional object of the present invention is to provide a shaft guard which may be easily cut to size and installed in situ.

Yet another object of the present invention is to provide a shaft guard which visually alerts persons in the vicinity to the rotation of the shaft.

An additional object of the present invention is to provide a shaft guard which is self contained, and requires no modification of the shaft or machinery for installation.

A still further object of the present invention is to provide a shaft guard which may be easily and quickly removed to provide access to the shaft.

As will be discussed in detail in the description of the preferred embodiment which is set forth subsequently, the magnetic shaft guard in accordance with the present invention utilizes an elongated, hollow tube and a permanent magnet to hold the tubular guard in place on the rotating shaft. Sufficient clearance is provided between the shaft and the inner diameter of the tubular portion of the guard so that the guard will rotate freely relative to the shaft should external contact with the guard occur. A brightly colored spiral or other attention attracting design may be placed on the guard to visually alert persons in the vicinity that the shaft is rotating.

The magnetic shaft guard in accordance with the present invention overcomes the limitations of the prior art devices and provides a safe, effective means for protecting against injury which might otherwise result from external contact with a rotating shaft. The magnetic shaft guard of the present invention provides a substantial advance in the art.

BRIEF DESCRIPTION OF THE DRAWINGS

While the novel features of the magnetic shaft guard in accordance with the present invention are set forth with particularity in the appended claims, a full and complete understanding of the invention may be had by referring to the detailed description of the preferred embodiment which is set forth subsequently, and as illustrated in the accompanying drawings in which:

DESCRIPTION OF THE PREFERRED EMBODIMENT

Figure 1:
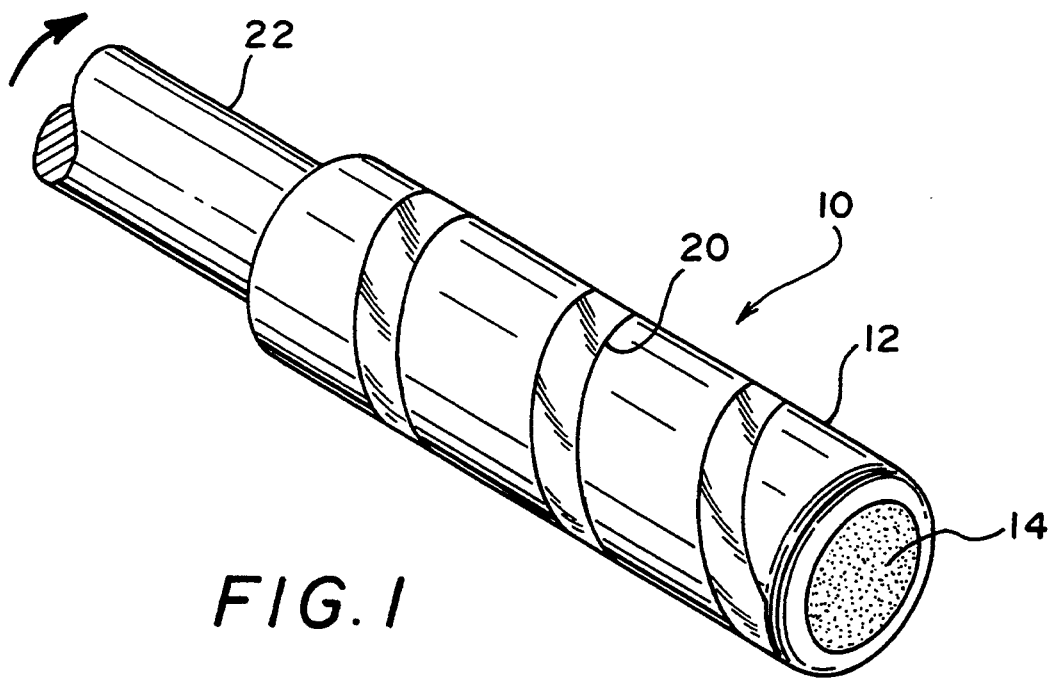
FIG. 1 is an isometric view of a magnetic shaft guard in accordance with the present invention.
Figure 2:
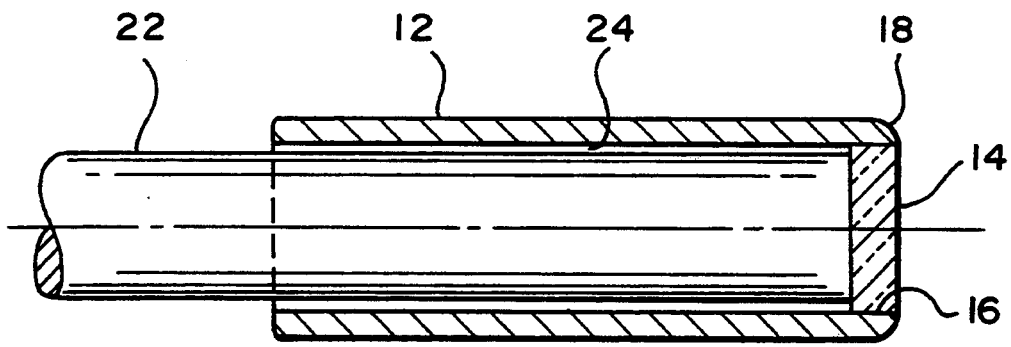
FIG. 2 is a sectional view of the device shown in FIG. 1.

Referring to FIGS. 1 and 2, there may be seen generally at 10 a preferred embodiment of a magnetic shaft guard in accordance with the present invention. Shaft guard 10 has a tubular body 12, which may be made from a standard size cylindrical tube of polypropylene, or other suitable material. A disc-shaped permanent magnet 14 is disposed at one end of tubular body 12, and may be held in place by an adhesive 16, by interference fit, or by other known means. The end of tubular body 12 having magnet 14 therein may have a rounded or chamfered edge 18 to insure that there are no sharp edges exposed. A brightly colored spiral or other attention attracting design 20 may be placed on the exterior of shaft guard 10 to visually alert persons in the vicinity when rotation is occurring.

In use, a shaft guard of the present invention may be made of a standard length, brought to the site of a shaft 22 for installation, and cut to the appropriate length for the particular shaft. The size of the inner diameter of tubular body 12 is chosen such that there is a clearance space 24 which enables shaft guard 10 to be freely rotatable on shaft 22. When shaft guard 10 has been installed on shaft 22, magnet 14 holds shaft guard 10 firmly in place while shaft 22 is rotating so that the shaft guard 10 rotates with shaft 22. Should a person, animal, or object come into contact with shaft guard 10 while it is rotating with shaft 22, the external contact will break the magnetic hold of magnet 14, and shaft guard 10 will cease rotation while allowing shaft 22 to continue rotation within shaft guard 10. Since rotation of shaft guard 10 ceases upon contact, no injury occurs. When the external contact ends, magnet 14 will cause shaft guard 10 to again rotate with shaft 22. Design 20 on the exterior of shaft guard 10 gives the appearance of motion when shaft guard 10 is rotating, visually alerting persons in the vicinity to the presence of the rotating shaft. Should access to shaft 22 be required, shaft guard 10 may be easily removed from shaft 22, and just as easily replaced when use of shaft 22 is no longer required.

While a preferred embodiment of a magnetic shaft guard in accordance with the present invention has been set forth fully and completely hereinabove, it will be apparent to one of skill in the art that a number of changes could be made without departing from the scope of the present invention. Changes in, for example, the materials used, shape and configuration of the tubular body, location and means of mounting the magnet, and the like can be made without departing from the true spirit and scope of the present invention which is accordingly to be limited only by the following claims.

What is claimed is:

1. A shaft guard positionable on a rotatable shaft and useable to provide protection from contact with an end of the rotatable shaft, said shaft guard comprising:

an elongate tubular body for placement about an end of the rotatable shaft, said elongate tubular body having an inner diameter and an exterior surface, said elongate tubular body further having a first end and a second end, said first end being generally open for receiving an exposed end of the rotatable shaft when said elongate tubular body of said shaft guard is placed about the rotatable shaft;

a clearance space between said inner diameter of said elongate tubular body and a maximum outside diameter of the rotatable shaft, said clearance space being of sufficient size to enable said tubular body to be slid over the rotatable shaft for mounting said shaft guard upon the rotatable shaft, said clearance space further being sufficient to permit said shaft guard to be held generally stationary on the rotatable shaft while allowing the rotatable shaft to freely rotate within said elongate tubular body; and a magnet located in said second end of said elongate tubular body for releasably magnetically adhering said second end of said tubular body to an end of the rotatable shaft, said magnet sized so as to release said shaft guard from magnetic adherence to the shaft end when external contact is made with said shaft guard.

2. The shaft guard of claim 1 wherein said magnet is a disc-shaped permanent magnet which is held in place within said second end of said elongate tubular body by an adhesive.

3. The shaft guard of claim 1 wherein said elongate tubular body is cylindrical in shape.

4. The shaft guard of claim 1 further including visual indicia on said exterior surface of said elongate tubular body to provide a visual indication that said shaft guard is rotating.

5. The shaft guard of claim 4 wherein said visual indicia is a spiral line formed along the exterior surface of said elongate tubular body.

6. The shaft guard of claim 1 wherein said elongate tubular body is a cylindrical tube of a plastic material which may be cut to size at a site of the rotatable shaft.

7. A shaft guard comprising:

a tubular body for receiving a shaft therein, said tubular body being generally elongate and having a first end and a second end, said first end of said tubular body being open for receiving an end of the shaft, said tubular body having an exterior surface and a minimum inner diameter;

a clearance space is formed between said minimum inner diameter of said tubular body and an outer surface of the shaft, said clearance space being sufficient to permit said tubular body to slide onto the shaft, said clearance space being large enough, and said tubular body being made of a material such that, external contact with said shaft guard positioned about a rotating shaft will cause said shaft guard to cease rotation while the shaft within said shaft guard continues rotating; and a permanent magnet disposed at said second end of said tubular body for magnetically retaining said shaft guard on an end of the shaft by magnetic force whereby external contact with said shaft guard when positioned on a rotating shaft will overcome said magnetic force to enable said shaft guard to cease rotation while allowing the shaft to continue rotating within said shaft guard.

8. The shaft guard of claim 7 wherein said tubular body is a cylindrical tube of a plastic material which may be cut to size at a site of the rotatable shaft.

9. The shaft guard of claim 7 further including a visually perceptible indicia on said exterior surface of said tubular body for visually indicating when said shaft guard is rotating.

10. The shaft guard of claim 9 wherein said visually perceptible indicia is a spiral line formed on the exterior surface of said tubular body.

11. The shaft guard of claim 7 wherein said permanent magnet is disc shaped and adhesively retained at said second end of said tubular body.

12. The shaft guard of claim 7 wherein said permanent magnet is disc shaped and is press fitted within said second end of said tubular body.

* * * * *